INVENTORS
ADOLPH A. ROHDIN
HOWARD A. ROHDIN

BY
ATTORNEY

INVENTORS
ADOLPH A. ROHDIN
HOWARD A. ROHDIN

BY *Ross O. Kurney*

ATTORNEY

United States Patent Office 3,457,700
Patented July 29, 1969

3,457,700
APPARATUS FOR HEAT SEALING LIDS
ON PREFORMED CONTAINERS
Howard A. Rohdin and Adolph A. Rohdin, Glen Ridge,
N.J., assignors to Packaging Industries Limited, Inc.,
Montclair, N.J., a corporation of New Jersey
Continuation-in-part of application Ser. No. 308,502,
Sept. 12, 1963. This application Feb. 18, 1965, Ser.
No. 433,630
Int. Cl. B65b 51/14, 51/32; H01j 9/00
U.S. Cl. 53—373                                     9 Claims

ABSTRACT OF THE DISCLOSURE

Apparatus for sealing lids onto preformed containers comprising a pressure station; means to present containers to be sealed to said pressure unit alternately from selected sides of said pressure unit; a pair of timers for controlling said pressure unit and means whereby one of said timers is placed in control of the operation of said unit depending on the side of said unit from which the containers are presented.

---

This application is a continuation-in-part of an application Ser. No. 308,502, filed Sept. 12, 1963, now Patent No. 3,170,275 dated Feb. 23, 1965. The entire disclosure of said application is hereby incorporated herein by reference and made a part hereof.

This invention relates generally to a machine in which the work is supplied from any side of a pressure unit. The work, comprising preformed containers (blisters in the parlance of the trade) and lids therefor is supported on a tray. When the tray arrives from one side properly within the pressure unit, a cycle is triggered automatically in which heat and pressure (predetermined in each case) are applied for a predetermined, but adjustable time, after which the work carrying tray is removed to the side whence it came and replaced by a tray from the other side, which tray has been prepared during the previous cycle.

In this application the work is shown entering the pressure unit alternately from opposite sides. This simplifies the disclosure, but it is not meant to exclude from the scope of the claims entry from any side and exit from any other nor to exclude consecutive entries and exits from sides at angles to each other (e.g.: octagonal arrangement) nor to exclude presentation of the work by belts or turrets.

It is an object of the present invention to improve the versatility and broaden the selectivity of such a machine without, however, proportionately increasing the cost or complexity of the machine. The present invention individualizes the time, temperature and in some cases the pressure applied to each tray, no matter from which side it enters the pressure unit.

It is a further object of this invention to provide improved electrodes for sealing, and an improved arrangement of electrodes to minimize the production of defective seals. When the standards of acceptability are high, as when truly hermetic sealing is required, it is utterly impossible to produce millions of perfect seals by any apparatus whatever. That is, there will always be some percentage of defectives. Improvement lies in reducing that percentage, and a substantial reduction over prior practice is achieved by this present invention.

It is a further object of this invention to provide an improved tray or work carrier for use in the machine aforesaid.

It is a further object of this invention to provide an improved electrode for use in the machine aforesaid.

It is a further object of this invention to provide an improved arrangement of electrodes for applying heat to either or both sides of the work to be sealed.

It is a further object of this invention to provide an improved method of making electrodes as aforesaid.

The above and other objects will be made clear from the following detailed description taken in connection with the annexed drawings in which.

Figure 1:
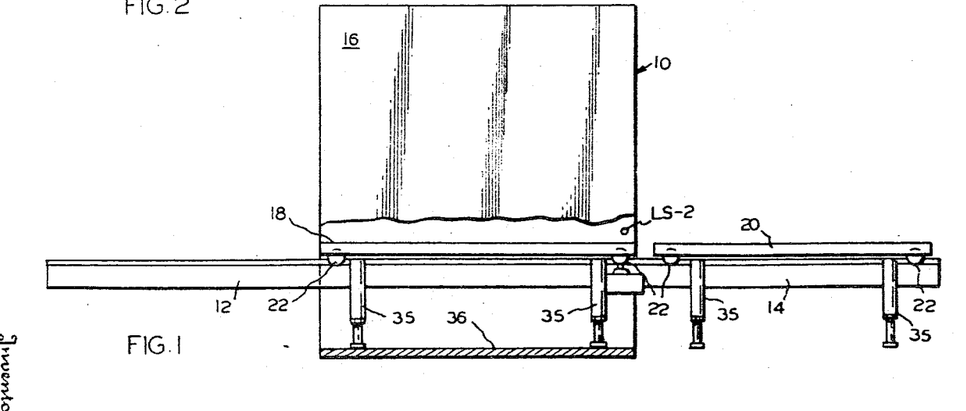
FIGURE 1 is a front elevation of the apparatus.
Figure 2:
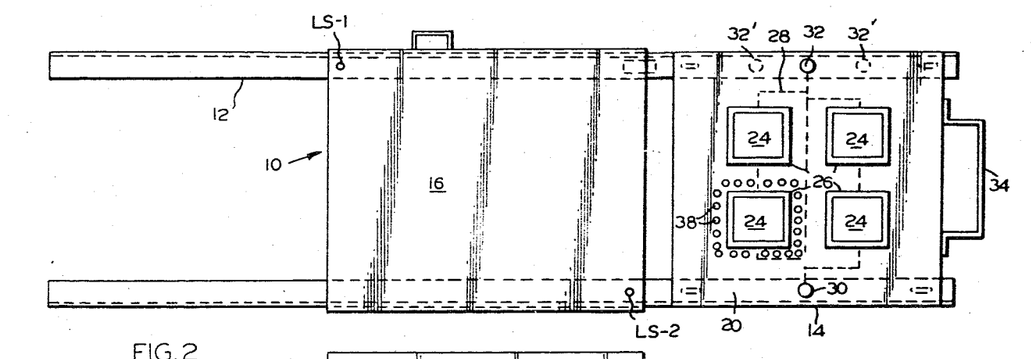
FIGURE 2 is a plan view of the apparatus.
Figure 3:
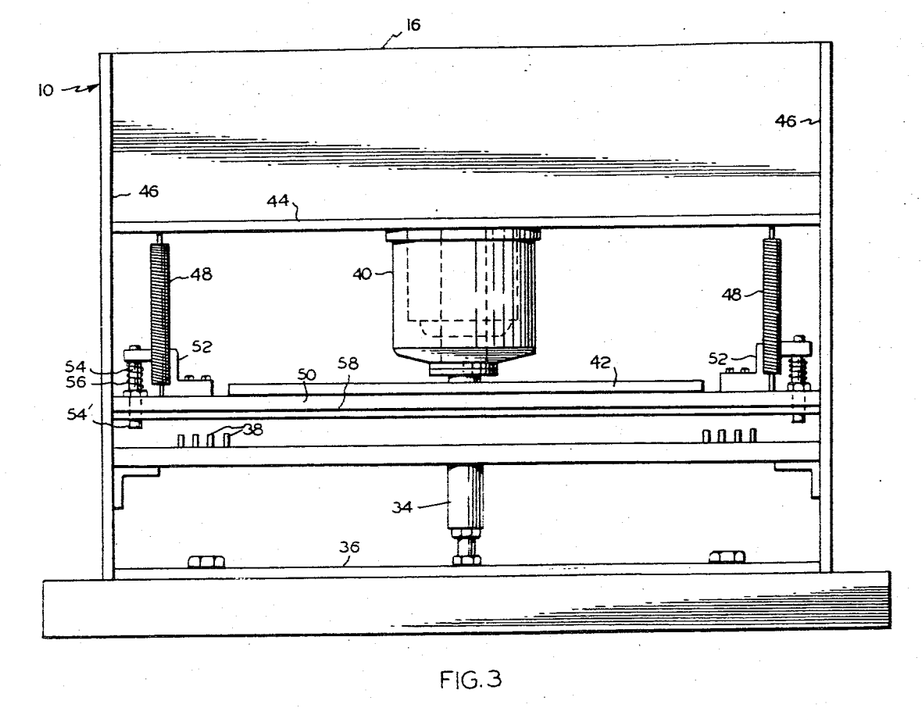
FIGURE 3 is a partial sectional view of the apparatus taken on the line 3—3 of FIGURE 2.

Referring now to FIGURES 1, 2 and 3, there is shown a machine generally designated 10 having a pair of guide rails 12 at one side and a pair of similar guide rails 14 at the opposite side of a pressure unit 16. A pair of blister receiving trays 18 and 20 are provided, each mounted on rollers 22 for rolling contact on the rails 12 and 14. As shown in FIGURE 1, the tray 18 has been rolled along the rails 12 until it is squarely under the pressure unit 16, while a tray 20 lies exposed on the rails 14. All of the trays have a plurality of blister receiving openings 24, as schematically illustrated in FIGURE 2. Each of the openings 24 is surrounded by a heating electrode 26. These electrodes are connected by lines 28 to a return line contact 30, which usually will have the same location on the surface of the tray, and to a feed contact 32 which may have any of several locations 32' on the platen. As will be noted in FIGURES 1 and 2, the tray 20, in the position shown, has no connection with the machine as a whole except the rolling contact between the rollers 22 and the rails 14. It may be removed and replaced by a tray having different openings 24 connected to a feed contact 32' to convey a different voltage especially suited to the blisters to be placed in the openings of the substituted tray. Such substitution is quick, easy and involves no releasing, fitting, or adjustment.

As shown in FIGURE 1, while the tray 18 is being processed in the pressure unit 16, the tray 20 is exposed, enabling the operator at that side of the machine to remove the heat sealed product of the previous operation, and place new, filled blisters in the openings 24, and to apply covers or lids to the blisters. On completion of a cycle by the pressure unit 16, the operator at the opposite side of the machine withdraws tray 18 from unit 16 onto rails 12, and his fellow operator pushes tray 20 into unit 16 in the position occupied by tray 18 in FIGURE 1. For this purpose, all of the trays are equipped with handles 34 as shown on tray 20 in FIGURE 2. Another feature common to all of the trays is the provision of adjustable pressure resisting studs 35, protruding from the undersides of the trays. The studs 35, when the tray is in the unit 16, make conact with a base plate 36 to resist the pressure applied in the unit 16. Another feature common to all trays is the provision of a pattern of spring pressed, retractable pins 38, surrounding each of the openings 24. Their purpose is to guide a cover for each blister into its proper position relative to the sealing flange of the blister. When the tray is in the unit 16, and sealing pressure is applied, these pins retract to the level of the flanges and do not interfere with the pressing operation.

Referring to FIGURE 3, which is a partial section taken generally on the line 3—3 of FIGURE 2, the unit 16 contains a pneumatic pressure cylinder 40 actuating a pressure plate 42. The cylinder 40 is secured to a plate 44 which in turn is secured to the walls 46 of the unit 16. Suspended from the plate 44 are tension springs 48 which support a pressure platen 50 secured to the pressure plate 42. Brackets 52 are mounted on the platen 50 and each contains a stripper pin 54 surrounded by a compression spring 56 and having an end 54' protruding through the platen 50 which preferably has a surface layer 58 of somewhat resilient silicone rubber. The pins 54 and their contact ends 54' are insulated from the rest of the machine by conventional means not shown. A tray 18 is supported on rails 12 with its supporting studs 34 in contact with the base plate 36. Upon actuation of the cylinder 40, the pressure plate presses down the platen 50 into contact with the tray 18. Guide pins 28 retract into the tray 18 and stripper pins 54' retract into the pressure platen 50 after having established electrical connection with contacts 30 and 32. When pressure is established between the pressure platen 50 and the tray 18, a predetermined, selected voltage is applied to the electrodes 26 surrounding the openings 24 in the platen 18. The voltage is applied for a predetermined, but adjustable period of time. When the voltage is cut off, usually the pressure cylinder is deactivated and the pressure platen 42 rises to the position shown in FIGURE 3 by tension springs 48 drawing the pressure platen 50 away from the tray 18 while the stripper pins 54' assure separation between the pressure platen 50 and the tray 18 which is now ready for withdrawal to the left hand side of FIGURE 1 to be replaced by the tray 20, whereupon the cycle is repeated.

The space above plate 44 is more or less filled with equipment for carrying out the above described cycle. Such equipment is available in the open market, for which reason the transformers, timers, relays, limit switches, etc., will not be described in detail, but only in connection with FIGURES 11, and 12.

Figure 4:
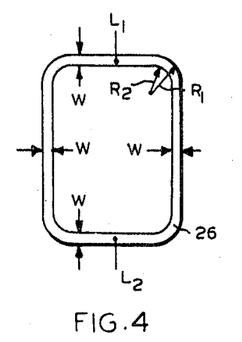
FIGURE 4 is a plan view of one of the heating electrodes.

The heating electrodes, one example of which is shown in FIGURE 4, form a material and distinct part of this invention, and, indeed, such electrodes mark a major break-through in the art of heat sealing whether or not used in the context of the combination in which they here appear.

Figures 4A, 4B:
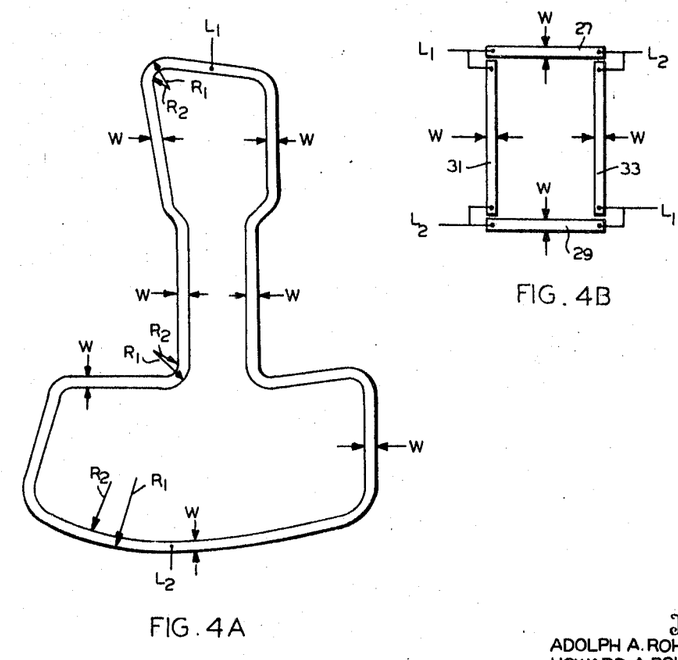
FIGURE 4A illustrates a more elaborate type of electrode.
FIGURE 4B shows a special electrode for non-hermetic sealing.

Referring now to FIGURE 4, a generally rectangular electrode 26 is shown. This, preferably is formed of highly resistant metal, e.g.: Nichrome or stainless steel. Various non-metallic and semi-metallic conductors have been developed and the use of any of these in place of the metallic conductors described herein is within the purview of this invention. These electrodes could be stamped from sheet stock at low unit cost, but since only limited quantities of any particular design are required, the die cost would be prohibitive. The electrodes, therefore, are machined from sheet stock, and the accuracy of machining versus stamping materially improves the performance of the electrodes. The essential factor is that at all points around the electrode, the width be constant. This becomes a problem only at corners which are machined to an internal radius $R_2$, and an external radius $R_1$ both radii having a common center and having the relationship $R_1-R_2=W$. Of course, from the standpoint of electrical resistance, uniform heating requires uniform cross-section. Under modern production methods, however, thin sheet stock as here contemplated may be presumed, quite fairly, to be of uniform thickness within the rather limited area occupied by any electrode. FIGURES 4 and 4A may be considered to be characteristic of the overwhelming bulk of present practice. In all of these figures L1 represents the feed line and L2 represents the return line. The lines L1 and L2 should be attached to the electrodes at such location that the lineal extent of the electrode between L1 and L2 shall be the same whether to right or left of each connection as shown in FIGURES 4 and 4A.

FIGURE 4B is a special case where the hermetic sealing is not required. Here a rectangle is defined by top and bottom strips 27 and 29 and by side strips 31 and 33. These several strips may abut or be welded together, but preferably a slight gap is permitted at each corner and each strip has its own L1 and L2 connections. If necessary or desired, separate voltages may be applied to strips of the same length, e.g.: 31 and 33 on the one hand and to 27 and 29 on the other. Simple straight strips as shown can be produced without resort to expensive machining operations.

While in FIGURE 2 the contact 32 represents L1 and the contact 30 represents L2 and the lines 28 connect the electrodes, this is simply a matter of convenience when the several electrodes 26 are identical. It is perfectly possible, using, for example, the electrodes of FIGURES 4 and 4A to hook these parallel, and even, still using a common return, to use separate L1 lines for each as will be made clear in the discussion of FIGURE 12.

Figure 5:
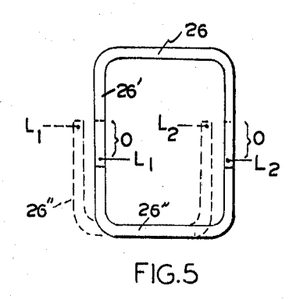
FIGURE 5 shows a special form of dual electrode.
Figures 6, 7, 8:
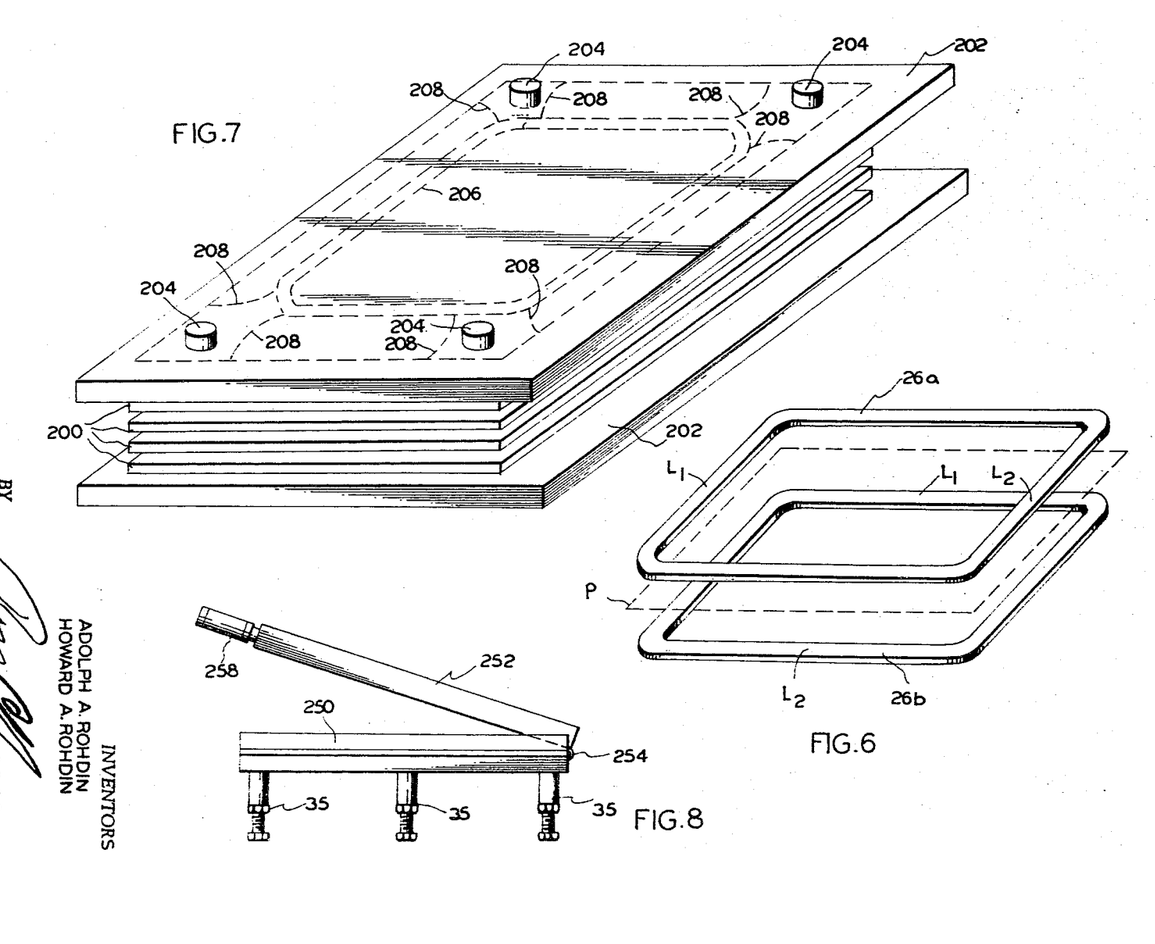
FIGURE 6 shows in perspective superimposed electrodes operating from opposite sides of the work to be sealed.
FIGURE 7 is a perspective view of a clamping arrangement for use in making electrodes, the subject of this invention.
FIGURE 8 is a side elevation of an improved tray or work carrier.

Referring now to FIGURES 5 and 6, these were arrived at to achieve the object of minimizing the production of defective seals. As previously noted, uniform temperature throughout the body of the electrode is essential. If time were not of the essence, uniform heating by sheer conduction would occur. It has been found, however, that when the time is very brief, the electrode, in the immediate vicinity of the L1 and L2 connections is apt to be of lower temperature than that attained in the remainder of the electrode. There is no present scientific explanation for this, but it is a fact, and when the sealing standard is hermetic, occasional defective seals may be produced.

FIGURE 5 shows an electrode 26 similar to FIGURE 4, but made up of two complimentary parts 26' and 26''. The part 26'' is also shown in dotted outline in FIGURE 5. In each of 26' and 26'' the L1 connection is at one extremity and the L2 connection at the opposite extremity. When the portions 26' and 26'' are superimposed by upper and lower pressure platens as shown in FIGURE 5, the extremities overlap to the extent marked by the bracket O with the respective L1 and L2 connections mutually offset. It has been found that this arrangement results in extremely uniform heating of the electrode as a whole with a measurable reduction in the occurrence of defective seals. No attempt is made here to explain the "why" of this phenomenon. If only a single platen is to carry electrodes, then 26' and 26'' are superimposed in a single plane with a thin insulating coating therebetween in the region of the overlap O.

In FIGURE 6 two electrodes 26A and 26B are placed on opposite sides of the work plane P. Each of these corresponds to FIGURE 4. The upper electrode 26A has L1 and L2 connections located centrally of its *ends* while the electrode 26B has its L1 and L2 connections located centrally of its *sides*. When the electrodes 26A and 26B are superimposed on work in the plane P the relatively low temperature areas adjacent the respective L1 and L2 connections are counterbalanced by adjacent, fully heated portions of the opposite electrodes and defective seals are minimized.

As has been noted exact dimensioning of the electrodes is essential, and while exactitude could be obtained by die-stamping, the cost of precision dies is high, and the the quantity of any given electrode is small, accordingly precision die-stamping is far too costly. The electrodes themselves are thin in caliper, a range from 0.005" to 0.010" will cover most of the practical requirements, and almost impossible to work individually. To meet the problem, resort is had to the expedient illustrated in FIGURE 7.

In FIGURE 7 a number of sheets 200 of stainless steel or Nichrome or other suitable material, of the caliper of the ultimate electrode are sandwiched between plates 202 of aluminum of substantial thickness, say about one-eighth of an inch. Since the sole contribution of the plate is rigidity, the material of which the plate is formed is important only from a cost standpoint. Aluminum is favored because of its easy machinability, but hardboard of the Masonite type or any other material could be substituted. For clarity of illustration, the various plates are shown slightly separated in FIGURE 7, but in practice are closely superimposed. The pack is drilled at several points and secured together by bolts or rivets 204 so that the pack as a whole is rigidly secured together. An electrode, in this case, similar to FIGURE 4 is outlined at 206 between the bolts 204 and the interior is machined out to conform to the desired outline. The machining may be by any conventional means, as grinding, routing, milling or filling. The outside then is similarly machined to leave the desired uniform width of the electrode. The machining, however, is carried out so as to leave tabs, as indicated by dotted lines 208, supporting the bolts 204. The bolts are removed, one at a time, the tabs are machined away and their bases are blended in.

In some cases, it is possible to dispense with the bolts by coating the sheets and plates with a remeltable adhesive of the hot melt type, assembling them and pressing them into a pack, and on conclusion of the machining operation, heating the pack to free up several sheets. If enough identical electrodes are required, say, a dozen or more, it also is possible to use sheets of paper, cloth, glass cloth or other material coated both sides with pressure sensitive adhesive. Such sheets, placed between superimposed sheets of electrode forming material (the latter need only be electrically conductive *and* resistant) will form a sufficiently rigid body to be just as machinable as the plate "sandwiched" heretofore described.

Either way there is a considerable waste of material, but the overall cost is trivial compared to the cost of amortizing precision dies over a relatively small number of electrodes.

Figure 9:
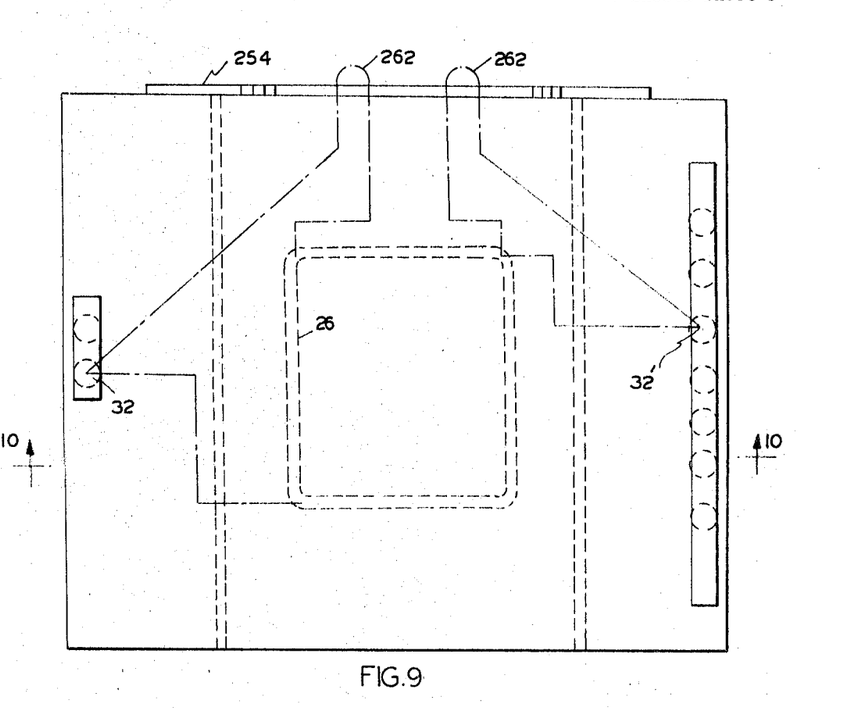
FIGURE 9 is a plan view corresponding to FIGURE 8.
Figure 10:
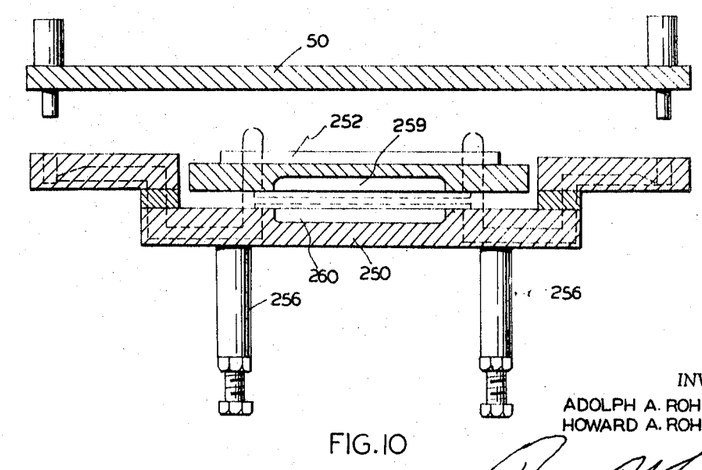
FIGURE 10 is a section on the line 10—10 of FIGURE 9.

In machines of this class, as in most machines, the more continuous the operation, the greater the efficiency and the less the unit cost of the product. It is important, therefore, that when adjustments are to be made to accommodate a change in the product, they be made apart from, and without interruption of the machine. In FIGURES 8, 9 and 10 there is disclosed a form of tray or work carrier which may be used to that end.

Usually the trays simply position and support the blister and its lid and carry these into the pressure unit where, usually, and preferably, the seal is completed by heat applied from below the blister flange and its superimposed lid. In some cases, however, the blister body will protrude through a display card, and the blister will be closed by a transparent plastic lid sealed directly to the blister flange, with the flange, at the same time being sealed to the display card. The need also may arise for sealing together the flanges of the superimposed blisters, with or without the presence of the display card. As a matter of fact, the *principles* of this disclosure are applicable to other than technically *preformed* containers.

For example, the machine here disclosed may be used to seal a label to a cloth sample, or to make a shrink fit package of an orange, or a golf ball between superimposed plies of biaxially oriented films in the polyvinyl or polyethyline categories. This does not exclude any film, of whatever nature, that will shrink under predetermined conditions. In such cases, the trays of the application aforesaid could not be used, and the machine itself would have to be modified or adadjusted to supply sealing temperature to both top and bottom as well as to accommodate the proturberance of the package beyond the top plane of the tray.

FIGURE 8, 9 and 10 show a means for meeting this problem. Referring now to FIGURE 8, there is shown a compound tray comprising a bottom portion 250 and a top portion 252 hinged at 254 to the bottom portion 250. The bottom portion 250 carries adjustable supporting studs 35, such as disclosed in FIGURE 1. The top portion 252 carries a handle 258 for raising and lowering the portion 252 and for moving the compound tray into and out of the pressure unit. The hinge 254 may be placed on any of the four sides, and the handle 258 may be placed on any side except the hinged side itself.

As shown in FIGURES 9 and 10, the upper portion 252 has a blister or product receiving cavity 259 registering with a blister or product receiving cavity 260 in the lower portion 250. As shown in FIGURE 9, each cavity is surrounded by a heating electrode 26. The electrode 26 surrounding the upper portion cavity 259 is connected, in parallel to the electrode 26 surrounding the lower portion cavity 260 through flexible connections 262 which accommodate movement about the hinge 254. One corner of the upper electrode 26 is connected to a predetermined contact 32' and its opposite corner is connected to the return contact 32. Diagonally opposite corners of the electrode 26 surrounding the lower cavity 260 are similarly connected to secure the temperature equalization effect above described. The cavities 259 and 260, of course, may be complete apertures and more than one cavity or aperture may be found in each portion.

Figure 11:
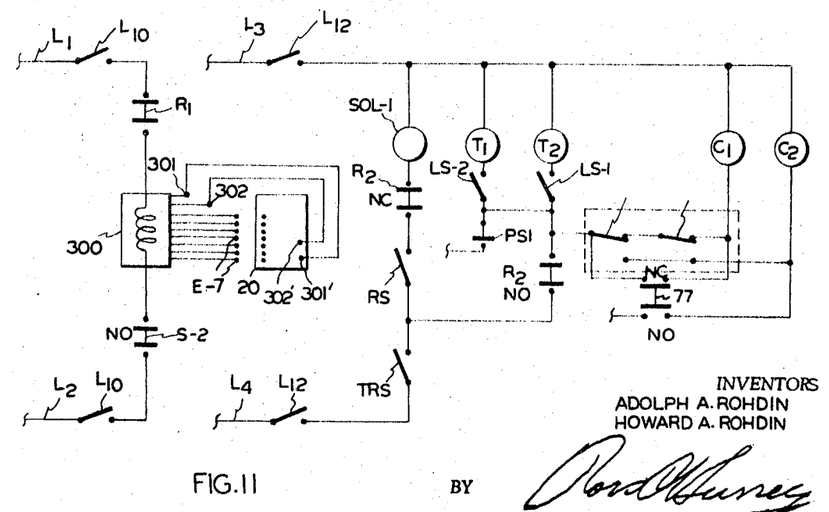
FIGURE 11 is a wiring diagram illustrating the use of timers individual to trays entering the pressure units from opposite sides.

FIGURE 11 illustrates an attack on what are two problems, individually distinct in the sense that either might be used without the other, but which nevertheless have mutual cooperation in the actual operation of the machine. In the left hand side of FIGURE 11 is shown an arrangement for multiplying the number of voltages available for selection, while the right hand side shows an arrangement whereby the timing for trays entering from one side of the machine may be predetermined to a setting different from the setting for trays entering from the opposite side.

The left hand side of FIGURE 11 is fed by lines L–1 and L–2 while the right hand side is fed by lines L–3 and L–4. The reason for this is that in the left hand, or sealing circuit side, it may be desirable to use a higher applied voltage, say 220 v. to 440 v., whereas on the right hand or actuating side, 110 v. usually will be entirely adequate. The left hand side is under the control of a seal switch L–10 while the right hand side is under the control of a main switch L–12.

When the seal switch L–10 is closed, L–1 and L–2 are connected to relay S–2 (NO) to energize the primary coil of a transformer 300. The secondary of the transformer 300 has a plurality of taps E–7. These are connected to a retractable mounting in the pressure platen 50. All of the taps E–7 are energized, but only one of them will make contact with a particular electrode (32–32') on a tray 20, thereby applying heating current to the sealing bands 26 (FIGURE 2). There are, however, two return taps 301 and 302, each a secondary of the transformer 300 and one of these will be engaged by a specially located return electrode 301' and 302' on the tray 20. Preferably there is a voltage differential between taps 301 and 302 to increase or decrease the voltages of taps E–7 as may be found essential for the tray electrodes. As a result, if the voltage differential between taps E–7 in FIGURE 11 will provide five volts, the taps E–7 shown in FIGURE 11 will provide from top to bottom 55 v., 60 v. . . . 85 v. when the return is through tap 301, then if the return is through tap 302, the taps E–7 will provide, once again from top to bottom, voltages of 20 v., 25 v. . . . 50 v. Thus, by the addition merely of a second *location* for a return tap 301' or 302', the number of available voltages is doubled. The voltages stated are purely arbitrary and illustrative and not at all restrictive. Clearly the number of return taps could be increased, with the result of making available still a greater variety of voltages. Two return taps, however, seem entirely adequate for any problems thus far encountered.

Closing the main switch L–12 merely conditions the right hand circuits for operation. It must be emphasized that if the same voltage is adequate for both the left and the right hand circuits of FIGURE 11, line L–1 will become identical with L–3, line L–2 will become identical with L–4 and the main switch L–12 may be eliminated, this placing the entire organization under the control of main switch L–10.

Now let it be assumed that a tray 18 has entered the pressure unit 16 from the left, as viewed in FIGURE 2. As the tray 18 entered the unit 16 it first encountered a tray switch TrS. This, preferably is a limit switch with a roller arm and is wired directly to a relay R2 which is conditioned to a normally open position (NO). As the tray continues from approximately its half-way position to its final position, the latter being defined by kerfs cut into the rails 12–14, it closes rail switch RS which is a limit switch of the plunger type. This energizes a line 75 through the normally closed (NC) side of the relay R2 and thus energizes a solenoid SOL–1. The solenoid SOL–1 operates a valve to actuate the pressure cylinder 40. When the pressure in the cylinder 40 reaches a predetermined point, a pressure switch PS closes.

A pair of timers T–1 and T–2 are provided. These are connected in parallel to the line L–3. Each timer is adjustable to provide any desired interval of sealing. The term "pair" is entirely fortuitous and not by way of limitation. Three or more could be used, or a single timer, responsive to multiple, predetermined settings could be used. The timers are also connected in parallel to the pressure switch PS. Between the pressure switch PS, however, and the timers T–1 and T–2, there is inserted in the line of timer T–1 a limit switch LS–1 and in the line of timer T–2 a limit switch LS–2. The general location of these limit switches is shown in FIGURES 1 and 2 where it will be noted that, in plan view (FIGURE 2) they are at diagonally opposed corners of the pressure unit 16, and generally in the plane of the trays, in the case of FIGURE 1, tray 18. The point is that the limit switches L–1 and L–2 are normally open, and that LS–2 can only be closed by arrival of a tray 18 entering the pressure unit 40 from the left hand side of FIGURES 1 and 2 while the limit switch L–1 can only be closed by a tray 20 entering the pressure unit from the right hand side of FIGURES 1 and 2.

For the present purpose, it is assumed that a tray 18 is in the position shown in FIGURE 1, hence that limit switch LS–2 is closed by the time the pressure switch PS is closed. Closure of the pressure switch PS therefore starts the timer T–2. Starting of the timer T–2 energizes a control relay C–1 through normally closed switch 77. The relay C–1 closes a normally open switch S–2 in the circuit of transformer 300 and thereby energizes the several electrodes E–7 mounted in the pressure platen 50. Although all of the electrodes E–7 are energized, only one of them will make contact with a particular "input" electrode (32–32') on the tray 18, thereby applying heat to the sealing bands 26 (FIGURE 2).

Now the adjustable timer T–2 runs out and in so doing reverses the NO and NC positions of the timer switch 77 to deenergize C–1 and to energize C–2. The latter breaks the circuit through switch R–2 (NC) thereby deenergizing SOL–1 and exhausting air or other fluid from the pressure cylinder 40 to permit rise of the pressure platen 50. The reduction of pressure, of course, opens the pressure switch PS. A further effect is to close normally open relay R–2 to hold the timer T–2 at zero and prevent recycling until the tray is withdrawn clear of the tray switch TrS when all circuits are broken and the timer T–2 is reset for the next seal. It is to be noted that the timer T–2 controls only the duration of the application of voltage to the heat sealing bands 26. It becomes effective only when sealing pressure is attained, and when T–2 times out, not only is heating terminated, but the pressure is relieved. Should a cooling period be desired, it is only necessary to insert a "time delay" relay in the circuits of either T–1 or T–2 so that timing out of T–1 or T–2 will disconnect voltage to electrodes E–7 but *not* disconnect the circuit through PS.

Upon completion of the operation just described, tray 18 is removed from its position in FIGURE 1. This automatically opens limit switch LS–2, rendering timer T–2 inoperative. Tray 18 is replaced by tray 20 moving in from the right hand side of FIGURE 1. Entry of tray 20 closes first the switch TrS and then RS to energize SOL–1. At the same time that the tray 20 closes switch RS it also closes limit switch L–1 to prepare timer T–1 for operation. The solenoid SOL–1 brings up the pressure to close pressure switch PS, start timer T–1, energize C–1 and produce another cycle, timed however, by timer T–1. Trays 18 and 20, therefore, may have completely different and independent timing of the cycles, and therefore may operate each on radically different products.

Under some circumstances, it may be desired to use the same tray for products having quite different sealing characteristics, so that, with the same tray, not only the time but also the temperature would be quite different as between one product and another on the same tray. When this is the case, the fixed contact idea becomes impractical, this necessarily involving always the same voltage, hence the same temperature. This problem is dealt with in FIGURE 12.

Figure 12:
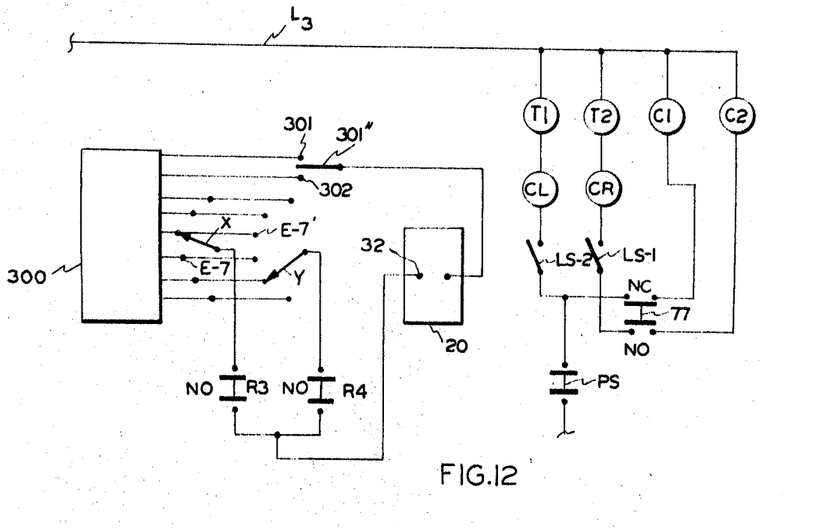
FIGURE 12 is a diagram similar in part to FIGURE 12 but showing an optional arrangement of voltage selectors on the machine.

Referring now to FIGURE 12, the secondary of the transformer 300 is connected in parallel to two sets of electrodes E–7 and E–7' each arcurately arranged for selective contact respectively with manually adjustable selector arms X and Y. The arm X is connected to a normally open relay switch R–3 while the arm Y is connected to a normally open relay switch R–4. The switches R–3 and R–4 are connected in parallel to a line leading to a single electric heating contact 32 on a tray 18 or 20 as the case may be. The alternate return lines are connected to electrodes 301 and 302 for contact with a single electric heating contact 301' or 302' on the tray 18 or 20, selectively placed to pick up the requisite return voltage.

A control relay CL is placed in series with the limit switch LS–2 and timer T–1 while a control relay CR is placed in series with limit switch LS–1 and timer T–2. The relay CR controls the switch R4 for the arm Y while the relay CL controls relay switch R3 for the arm X. Assuming, for example that a tray has closed limit switch LS–1, and has also closed switch TrS and RS to energize the solenoid SOL–1, then the pressure switch PS will close to start timer T–2 and simultaneously energize control relay CR to close relay switch R–4, and, through arm Y and electrode E–7' deliver the selected voltage to tray 18 or 20 as the case may be. Any given tray, therefore, may be subjected to any predetermined combination of voltage and temperature, but such tray has only one pair of electrodes. It is to be noted that a manually operable selector switch 301' makes either return line 301 or 302 available at option.

The above arrangement can be automated and elaborated to include selection of pressure if desired. Naturally, such an arrangement will be more costly, but in some cases the additional cost will be warranted.

The heat sealing cycle depends on three quasi-independent variables, namely: time, temperature and pressure. The term "quasi-independent" is used advisedly, since there is a considerable extent of interdependence between all three. Of the three, time is the most important since minimizing *time* increases the productivity of any given machine. Temperature faces an upper limit for any given material to be sealed. It must be below the scorching or decomposition or liquefaction point of the material. Temperature also faces a lower limit which is the softening point of the material. For any given temperature within the limits specified, pressure also faces both upper and lower limits. Excessive pressure will result in lateral extrusion of the material to be sealed with resultant weakening of the seal. Insufficient pressure will require excessive time or else produce a large percentage of defective seals. For any given combination of material and caliper, however, the optimum combination of temperature and pressure for minimum time is easily determinable by conventional experimentation.

Figure 13:
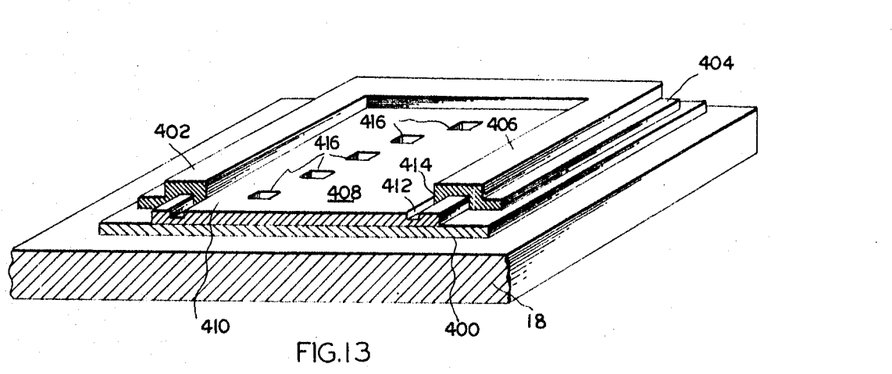
FIGURE 13 is a perspective of one corner of a tray carrying a special time-temperature-pressure selective device.
Figure 14:
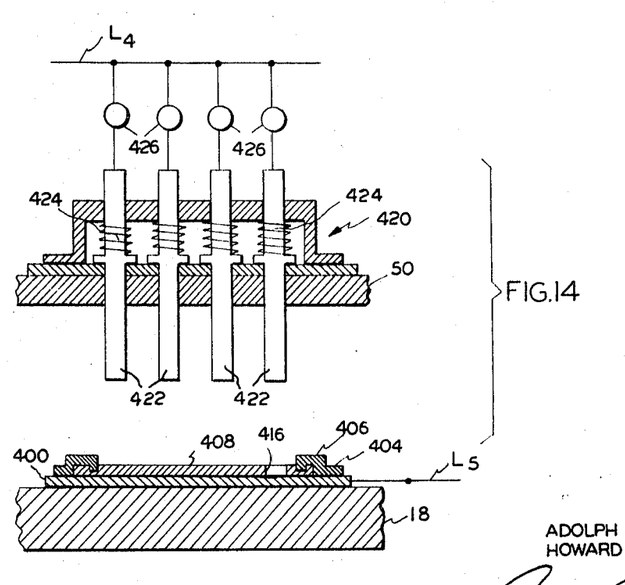
FIGURE 14 is a schematic diagram showing the operation of the device of FIGURE 13.

In the apparatus illustrated in FIGURES 13 and 14 it is assumed that for any particular sealing job, the optimum combination of time, temperature and pressure has been determined. In FIGURE 13 a tray 18 has adhered or otherwise secured to one corner a metal or otherwise conductive plate 400. To the plate 400 is secured a frame 402 of metal, plastic or other suitable material. The frame 402 has a base flange secured to the plate 402 and an upper, inwardly directed flange 406 which with the plate 402 defines a channel. A card 408 has at one end a broadened, indicia receiving stop portion 410. The body of the card has its margins received in the channel defined by the plate 400 and the upper flange 406 of the frame 402. The outer ends of the card portion 410 engage the ends of the frame 402 to limit inward movement of the card 408. A groove 412 in the card 408 mates with a tongue 414 on one side of the upper flange 406 of the frame 402. This insures that all cards 408 inserted in the frame 402 will occupy the same position. The cards 408 should be dimensionally stable, rigid and rugged. Preferably the cards are made from thin hardboard of the Masonite type.

Perforations 416 are formed in the card 408. These are arranged in columns as is conventional in punched card practice, each column representing time, or temperature, or pressure. The particular time, temperature or pressure is determined by the location, within its column of a particular perforation 416. In determining time, for example, two columns would be used, one calibrated in seconds and the other in ⅕ second. For practical pressure only about three perforations selectively available in a single column, and corresponding respectively to 50 p.s.i.; 100 p.s.i. and 150 p.s.i. should be adequate. For temperature, one or two columns with perforations corresponding to the taps E-7 of FIGURE 12 should be sufficient.

FIGURE 14 shows a sensing device 420 which functionally is conventional and which may be mounted in the pressure platen 50 for registry with a perforated card 408 mounted on a tray 18. Only a single row of sensing fingers 422 is illustrated. When the pressure platen 50 moves toward a tray 18, the sensing fingers 422 approach a card 408 positioned between flange 406 and the metal plate 400 secured to the tray 18. The metal plate is connected to a return line L-5 by any suitable means including a special one of the sensing fingers 422 in any column or in a separate column. Each of the sensing fingers 422 is spring relieved as at 424 and each is flexibly connected through a control relay 426 to a feed line L-4. When the descent of the fingers 422 brings them to the card 408 only one finger in any column will enter the single perforation 416 in that column to complete, through plate 400 a circuit between L-4 and L-5 to energize a particular relay 426. Control of timers, pressure valves and voltage selectors by means of relays is too conventional to require detailed discussion here. It is to be noted, however, that all selections defined by a punched card 408 are effective before the pressure switch PS (FIGURE 11) actually starts the timing, hence the heating cycle. The switch PS need only be set to respond to the minimum selected pressure.

Many modifications in detail of the foregoing disclosure will occur to one skilled in the art. The invention, therefore, is not to be limited to the details disclosed, but only as set forth in the subjoined claims.

What is claimed is:

1. Apparatus for sealing lids onto preformed containers comprising: a pressure unit; a heating means; adjustable timers to control said pressure unit and said heating means; means to present containers to be sealed to said pressure unit from selected sides of said unit and means operative to place a predetermined one of said timers in control responsive to entry of containers to be sealed from the selected side.

2. Apparatus for sealing lids onto preformed containers comprising: a pressure unit; heating means; a pair of adjustable timers to control said pressure unit and said heating means; means to present containers to be sealed to said pressure unit alternately from opposite side of said unit and means operative to place a predetermined one of said timers in control responsive to entry of containers to be sealed from one side or the other.

3. Apparatus for sealing lids onto preformed containers comprising: a pressure unit; a heating unit; a plurality of adjustable temperature control means; means to present containers to besealed to said pressure unit from selected sides of said pressure unit and means to place a predetermined one of said temperature control means in active control responsive to entry of containers to be sealed from the selected side.

4. Apparatus for sealing lids onto preformed containers comprising: a pressure unit; a heating unit; a pair of adjustable temperature control means; means to present containers to be sealed to said pressure unit alternately from opposite sides of said pressure unit and means to place a predetermined one of said temperature control means in active control responsive to entry of containers to be sealed from one side or the other.

5. Apparatus for sealing lids onto preformed containers comprising: a pressure unit; a heating unit; adjustable timers to control said pressure unit and said heating unit; a plurality of adjustable temperautre control means; means to present containers to be sealed to said pressure unit from selected sides of said pressure unit, and means to place a predetermined one of said timers and a predetermined one of said temperature control means in active control responsive to entry of containers to be sealed from the selected side.

6. Apparatus for sealing lids onto preformed containers comprising: a pressure unit; a heating unit; a pair of adjustable timers to control said pressure unit and said heating means; a pair of adjustable temperature control means; means to present containers to be sealed to said pressure unit alternately from opposite sides of said pressure unit, and means to place a predetermined one of said timers and a predetermine one of said temperature control means in active control responsive to entry of containers to be sealed from one side or the other.

7. Apparatus for sealing lids onto preformed containers comprising a unit having a pressure head; a work supporting tray movable laterally from a loading position to a working position relative to said head; means operative when said tray arrives at said working position for initiating a working cycle of said apparatus; a sensing device mounted in said pressure head; coded means mounted on said tray for engagement with said sensing device and means responsive to the engagement of said sensing device and said coded means for controlling the various elements of the cycle of said apparatus.

8. Apparatus for heat sealing comprising opposed pressure members, electrodes in the form of work surrounding loops attached to each of said members for mutual registry with the work to be sealed therebetween, each electrode having input and return connections on diametrically opposed sides of its loop, the connections on one electrode being positioned in diametric opposition to those on the other electrodes.

9. A tray for presentation to and withdrawal from a pressure sealing unit, said tray comprising: a rigid, lower member having at least one recess to receive a preformed, self-sustaining blister having a peripheral flange and to support said blister by said flange; a heating electrode on said lower member, surrounding said recess and underlying said flange; a rigid upper member hinged on one side to said lower member and swingable to give full access to said lower member; at least one electrode on said upper member sized, shaped and located to register, when the members are superimposed, with the electrode of said lower member whereby to clamp said flange and a blister lid therebetween for sealing said lid to said flange; said members having at least two contacts exteriorly presented for engaging mating contacts on said sealing unit, said contacts on said members being connected to said electrodes to energize both said electrodes.

References Cited

UNITED STATES PATENTS

| | | | |
|---|---|---|---|
| 3,170,275 | 2/1965 | Rohdin et al. | 53—373 |
| 3,255,567 | 6/1966 | Keslar et al. | 53—112 X |
| 3,316,690 | 5/1967 | Straub et al. | 53—373 X |

TRAVIS S. McGEHEE, Primary Examiner